Nov. 10, 1925.
F. D. ELLIOTT
1,561,420
FRAME FOR LICENSE PLATES
Filed Jan. 10, 1925
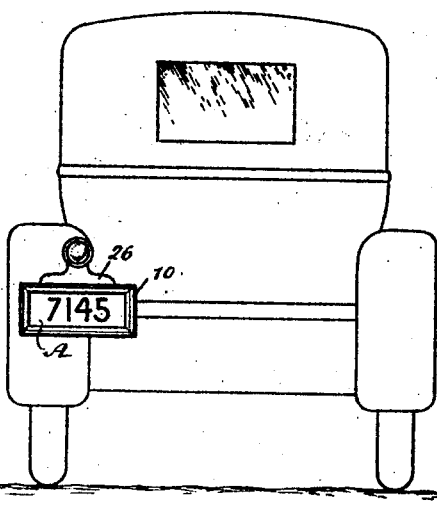
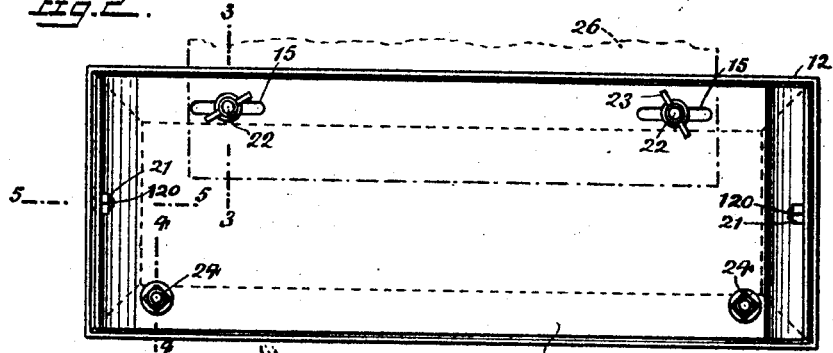

Patented Nov. 10, 1925.

1,561,420

UNITED STATES PATENT OFFICE.

FRED DEXTER ELLIOTT, OF SAULT STE. MARIE, MICHIGAN.

FRAME FOR LICENSE PLATES.

Application filed January 10, 1925. Serial No. 1,672.

*To all whom it may concern:*

Be it known that I, FRED D. ELLIOTT, a citizen of the United States of America, and a resident of Sault Ste. Marie, in the county of Chippewa and State of Michigan, have invented a new and Improved Frame for License Plates, of which the following is a description.

My invention although capable of other uses is particularly adapted for embodiment in a frame for automobile license plates.

The general object of my invention is to provide a frame which when employed for framing and securing a license plate will minimize or eliminate the non-æsthetic appearance of the usual license plate and its mode of mounting, and whereby the license plate instead of being a conspicuous and unfinished part of the automobile will not be inconsistent with the general beauty of the vehicle.

A further object of the invention is to provide a novel frame and back plate assemblage for the indicated purpose possessing strength and durability.

Reference is to be had to the accompanying drawings forming a part of this specification, it being understood that the drawings are merely illustrative of one example of the invention.

Figure 1 is a view showing a face view of my improved frame with a license plate therein, the same being illustrated as mounted at the rear of an automobile indicated diagrammatically;

Figure 2 is an enlarged rear elevation of my improved frame;

Figure 3 is an enlarged detail in transverse vertical section as indicated by the line 3—3 of Figure 2;

Figure 4 is a detail in transverse vertical section as indicated by the line 4—4 in Figure 2;

Figure 5 is a detail in horizontal section on the line 5—5 of Figure 2.

In carrying out my invention in accordance with the illustrated example, an outer four-sided frame element indicated generally by the numeral 10 is provided, and said frame includes a front 11 extending about the four sides of the frame and serves to "frame" a license plate A which is overlapped at its four sides by said front 11. The extreme inner edge portion of the front 11 is directed rearwardly in the form of a flange 13 extending about the four sides of the frame and adapted to make edge contact at the face of the license plate A materially inward from the edge thereof. Thus, an area of the license plate A at the four sides will be concealed by the front 11 of the frame 10. The frame 10 includes also a rearwardly directed flange 12 extending about the four sides of the frame at the outer edge of the front 11.

In association with the frame 10 I employ a back plate 14 and provide means for securing said back plate to the frame 10 and for securing the license plate to the back plate as follows:

The back plate 14 is formed adjacent to one longitudinal edge with slots 15 and near the opposite edge adjacent to each corner are bolt holes 16. Each end of the back plate 14 is shaped as shown in Figure 5 by producing thereon near the edge portion an oblique forwardly directed member or zone 17 and the material of the back plate at the outer edge of the oblique portion 17 is formed into a rearwardly directed flange 18 which lies parallel with and close against the end members of the flange 12. The flange 12 at the ends is formed with countersunk holes 19 and registering holes 20 are formed in the flanges 18. A flat headed bolt 120 similar to a stove bolt is passed through the flanges 12 and 18 and receives a nut 21 to firmly secure the back plate flange 12 of frame 10.

The license plate A is secured to back plate 14 as follows: Bolts 22 are passed through the slots 15 and into holes in the license plate A near one edge, said bolts having nuts 23 usually in practice in the form of wing nuts. The bolts 22 are passed through the license plate A from the front and then passed through the back plate so that the nuts 23 lie at the back of the frame. As will be readily understood from Figures 2 and 3, the bolts 22 lie at the back of the frame 10, that is to say, they are covered by the front 11 of said frame and completely concealed from view. Thus, the license plate appears properly framed with the securing means concealed. By the described arrangement the æsthetic attributes of the framed license plate are greatly enhanced. In addition to the bolts 22, bolts 24 are passed through the license plate A from the front, said bolts 24 being inserted through holes 25 in the license plate A and through the holes 16 in the back plate 14.

In practice the license plate A is secured to the back plate 14 by the bolts 22 and 24, then the back plate with the license plate thereon is secured to flanges 12 of the frame 10 by the bolts 20 and nuts 21.

Any approved mode of holding the assembled frame, back plate, and license plate on the automobile, through the medium of the bolts 22 or 24 may be adopted, either of said bolts being adapted to be passed through any license plate bracket 26 or other part of the automobile. It will be understood that the invention is adapted for holding and displaying a city name plate or the like as well as the license plate.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A frame for license plates and other purposes including a frame element having a front portion to conceal an area of the license plate at the four sides thereof and having a rearwardly directed flange at the outer edge of said front portion, and a back plate in said frame, said back plate extending behind said front of the frame element and having bolt holes and bolts in said holes in the area of the back plate covered by the front of the frame element, said bolts adapted to secure between the front of the back plate and the rear of the front of the frame element a plate to be framed; together with bolts extending transversely through the frame flange at the ends of the frame, and flanges on the back plate through which said last-mentioned bolts also pass for securing the ends of the back plate to the ends of the frame element.

2. A frame and back plate assemblage adapted to receive a license plate or the like and comprising a frame element having a front concealing an area of the back plate at all sides of the latter as well as a rearwardly directed flange at the outer edge of said front, means carried by the back plate and concealed by the front of the frame element adapted to secure to the back plate a plate to be framed, flange members on the back plate at the ends thereof, and bolts extending transversely through the flange of the frame element and the flanges of the back plate.

3. A frame and back plate assemblage adapted to receive a license plate or the like and comprising a frame element having a front concealing an area of the back plate at all sides of the latter as well as a rearwardly directed flange at the outer edge of said front, means carried by the back plate and concealed by the front of the frame element adapted to secure to the back plate a plate to be framed, flange members on the back plate at the ends thereof, and bolts extending transversely through the flange of the frame element and the flanges of the back plate, said back plate being offset rearwardly for the major portion of its area from the rear of the front of the frame element, and oblique members integral with the offset portion of the back plate with the end flanges thereof.

FRED DEXTER ELLIOTT.